April 28, 1970   W. A. CARLOUGH, JR   3,508,812

HIGHLY CORRECTED SIX ELEMENT GAUSS TYPE LENS

Filed May 12, 1967

| E. F. = 96mm (3.779") | | | f/5   MAG. = 12X | |
|---|---|---|---|---|
| LENS | $n_D$ | $v$ | RADII | THICKNESS |
| A | 1.620 | 60.3 | $R_1$ = 2.2528<br>$R_2$ = 6.2673 | $T_A$ = 0.3675<br>$S_1$ = 0.1788 |
| B<br>C | 1.620<br>1.617 | 60.3<br>36.6 | $R_3$ = 1.2069<br>$R_4$ = 16.6854<br>$R_5$ = 0.7912 | $T_B$ = 0.5305<br>$T_C$ = 0.1264<br>$S_2$ = 0.4312<br>$S_3$ = 0.6251 |
| D<br>E | 1.575<br>1.620 | 41.3<br>60.3 | $R_6$ = -0.6654<br>$R_7$ = -5.1639<br>$R_8$ = -0.8881 | $T_D$ = 0.0859<br>$T_E$ = 0.2249<br>$S_4$ = 0.1207 |
| F | 1.617 | 54.0 | $R_9$ = 92.7218<br>$R_{10}$ = -1.9668 | $T_F$ = 0.2109 |

INVENTOR.
WARREN A. CARLOUGH
BY
ATTORNEYS

United States Patent Office 3,508,812
Patented Apr. 28, 1970

3,508,812
HIGHLY CORRECTED SIX ELEMENT
GAUSS TYPE LENS
Warren A. Carlough, Jr., Rochester, N.Y., assignor to
Xerox Corporation, Rochester, N.Y., a corporation of
New York
Filed May 12, 1967, Ser. No. 638,059
Int. Cl. G02b 9/36
U.S. Cl. 350—221                        1 Claim

ABSTRACT OF THE DISCLOSURE

A six element gauss type lens for use with microfilm reduction or enlargement equipment with the lens elements made of relatively low index glass and being well corrected for chromatic and monochromatic image aberrations and further having a performance which is diffraction limited at approximately 10× to 18× magnification at $f/5$ and up to 100 mm. focal length.

BACKGROUND OF THE INVENTION

This invention relates to optical objectives for photographic projection and similar purposes and more particularly to improvements in a gauss type of lens system which works at approximately 12× magnification and is intended primarily for microfilm enlargement or reduction while employing low index of refraction glass.

In the art of microfilming it is essential to achieve a performance of high resolution within the capabilities of the photoreceptor. The range of magnification of microfilming apparatus is generally between 12× and 18× and a system resolution requiring a lens capability of 150 lp./mm. is not uncommon. It is important to achieve this high resolution while remaining generally free of all aberrations in order to first reduce and then enlarge documents or other data currently being microfilmed throughout the country.

With the avalanche of record keeping affecting modern business, industry and government, it has become important, if not essential, for these concerns to minify their records. This is generally done by copying the records onto microfilm at approximately a 12× reduction in size. The film may be then placed in suitably small files or in a unitized microfilm system combined with data processing equipment. These techniques reduce the storage space required for maintaining records and data relating to the business of the particular concern. When the documents of a particular business are reduced and placed on microfilm for storage and later enlargement if the same becomes necessary, it is essential that the reproduction at the standard size be of considerably good quality therefore requiring good photographic equipment and lenses to both reduce the original to the microfilm and then enlarge from the microfilm to a standard copy again. Lenses that have been designed for this purpose are generally expensive to make since they require glass components of relatively high indices of refraction in order to reduce the aberrations that may otherwise be introduced into the reduction or enlargement of the original document. The present lens design achieves exceptional results in correcting for coma, field curvature, distortion, chromatic aberrations, both axial and oblique spherical aberration and astigmatism within the ranegs of its use for microfilming documents or other data. The corrections are to such an extent that the lens in its preferred embodiment is considered diffraction limited at least in its preferred embodiment.

Other lenses of seemingly similar design but different purposes and capabilities are disclosed in Patents 2,532,751 and 2,532,752 both filed on Sept. 29, 1949 and both issued to J. G. Baker on Dec. 5, 1950. Both, however, are designed for infinity and would function poorly, if at all acceptably in a finite conjugate, enlarging and reducing system required of the present invention.

SUMMARY OF THE INVENTION

It is an object of this invention to provide a novel gauss type objective having a magnification of substantially 12× and providing a well corrected condition for chromatic and monochromatic aberrations and a diffraction limited performance.

Another object of this invention is to provide a well corrected finite conjugate gauss type lens for use in microfilming or the like.

BRIEF DESCRIPTION OF THE DRAWINGS

Further objects and advantages will be found in the details of construction by reference to the specification herein below taken in connection with the accompanying drawings wherein.

DESCRIPTION OF THE PREFERRED EMBODIMENTS

Figures 1, 2:
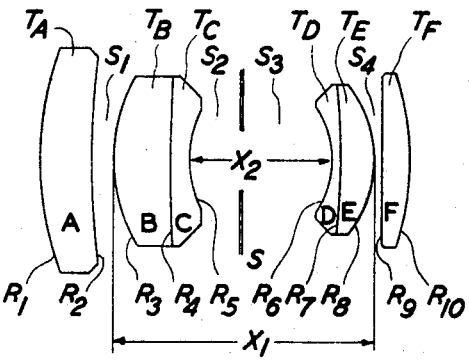
FIG. 1 is an optical diagram of a preferred embodiment of the lens of this invention.
FIG. 2 is a table of constructional data related to FIG. 1 with the dimensions in inches.

Referring to the figures, there is shown in FIGS. 1 and 2 a diagram and table of constructional data of a preferred embodiment of the invention which when employed in a 12× magnification system of an approximately 54 inch total conjugate length, is fully corrected for radiation between 5,000 A. and 5,090 A. for projection onto the photoreceptor. The lens is designed for operation over a field angle of ±13° with approximately 10% vignetting at the full field angle. Within these ranges and at a focal length of up to 100 mm. the lens can be said to perform in a diffraction limited manner with a resolution capability in excess of 250 lp./mm.

At magnifications of above 18× or below 10× the lens will hold good correction for aberrations such as, field curvature, distortion, chromatic aberration, both axial and oblique spherical aberration and astigmatism. This holds true to a magnification as great as approximately 24×. These unusually good results are attained with an $f/5$ stop over the entire image field format, while employing relatively inexpensive glass to form the individual elements of the lens.

The extremely high state of correction of this lens design employing inexpensive low index of refraction glass elements is achieved with six individual lenses including two singlets and two doublets comprising the design. Lens A is a singlet positive lens of generally meniscus form which is concave toward the central aperture stop S of the system in which the lens is employed. Lens F of the inventive design is a singlet of generally positive meniscus form with its concave surfaces facing the stop S. The central four lenses are two doublets (BC) and (DE) formed on opposite sides of the stop S. The first such set (BC) being of generally negative meniscus form composed of two lens elements which are in contact with each other and both of which are concave toward the stop S. Lens set (DE) is also of the negative meniscus form composed of two lens elements in contact with each other both being concave toward the stop S. The spacings of the two doublet lenses (BC) and (DE) relative to each other are such that the distances from the surfaces farthest from the aperture stop are a distance $X_1$ wherein $$0.5F < X_1 < 0.7F$$

F being the effective focal length of the entire lens system. The distance between the innermost surfaces of lenses, being the surfaces closest to the aperture stop S is designated as $X_2$ and is of a dimension such that:

$$0.2F<X_2<0.3F$$

Also, the ranges on the thickness of the doublet (BC) and the doublet (DE) is as follows: $0.2X_1<T_{BC}<0.4X_1$; $0.1X_1<T_{DE}<0.3X_1$ wherein $T_{BC}$ is the thickness from surface $R_3$ to surface $R_5$ on lenses B and C; and $T_{DE}$ is the axial thickness from surface $R_6$ to surface $R_8$ on lenses D and E.

The radii of the successive refractive surfaces of the lens members A to F named in order from the front surface of lens A to the rear surface of lens F are designated $R_1$ to $R_{10}$, the successive axial thicknesses of the lens elements are represented by $T_A$ to $T_F$, the included air spaces at the axis are designated $S_1$ to $S_4$ and the refractive index and Abbe number are represented by the symbols $n_D$ and $v$.

For the attainment of the objects of this invention, the focal lengths $F_A$ to $F_F$ of each of the successive lens components A, BC, DE and F have been discovered to be effective as stated in the range of values given in the table herebelow, wherein the letter F represents the equivalent focal length of the entire lens system:

$$1.2F<F_A<1.7F$$
$$2.4F<-F_{BC}<2.7F$$
$$4.5F<-F_{DE}<4.9F$$
$$0.7F<F_F<0.9F.$$

For the same reason, the values of the radii $R_1$ to $R_{10}$ of the lens surfaces, should lie within the range of the numerical values specified in the table given hereinafter:

$$0.50F<R_1<0.64F$$
$$1.43F<R_2<1.70F$$
$$0.28F<R_3<0.34F$$
$$4.30F<R_4<4.52F$$
$$0.19F<R_5<0.22F$$
$$0.16F<R_6<0.19F$$
$$1.24F<R_7<1.44F$$
$$0.19F<R_8<0.31F$$
$$24.10F<R_9<25.80F$$
$$0.41F<R_{10}<0.62F$$

A benefit of the present system is that the above results can be achieved with relatively inexpensive glass having a relatively low index of refraction. The parameters may be specified in the ranges of numerical values given in the following table:

| Lens | $n_D$ Minimum | $n_D$ Maximum | $v$ Minimum | $v$ Maximum |
|---|---|---|---|---|
| A | 1.620 | 1.639 | 55.5 | 60.3 |
| B | 1.620 | 1.639 | 55.5 | 60.3 |
| C | 1.613 | 1.620 | 36.3 | 36.9 |
| D | 1.573 | 1.581 | 40.8 | 42.7 |
| E | 1.620 | 1.639 | 55.5 | 60.3 |
| F | 1.614 | 1.622 | 53.1 | 55.1 |

Stated in a slightly different manner regarding the doublet lenses (BC) and (DE), the difference $d$ between the value of $n_D$ of the lens elements and the difference $d_1$ in the $v$ values between the lens elements are shown in the following table:

| Lens | Difference $d$ between value of $n_D$ of lens elements | Difference $d_1$ in $v$ values between lens elements |
|---|---|---|
| (BC) | $0<d<0.026$ with the lower value in element C. | $18.6<d_1<24.0$ |
| (DE) | $0.039<d<0.066$ with the lower value in element D. | $12.8<d_1<19.0$ |

What is claimed is:

1. An optical objective lens for enlarging or reducing and having a resolution capability of approximately 250 lp./mm. made of glass components throughout and well corrected from coma, field curvature, distortion, astigmatism, chromatic aberrations and both axial and oblique spherical aberration within a field angle of ±14° at a focal length of not greater than 100 mm. and at a magnification between 10× and 24× and an aperture stop at approximately $f/5$, said objective comprising a pair of doublet meniscus components each of net dispersive effect lying concave to each other at opposite sides of an air space and a single component disposed at opposite ends of the meniscus components, wherein the performance thereof is diffraction limited between magnifications of 9× and 18×, at a field angle of ±13° and the numerical values for the refractive index, $n_D$; Abbe number, $v$; radii, $R_1$ to $R_{10}$; axial thicknesses, $T_A$ to $T_F$; and axial air spacings between the lens components, $S_1$ to $S_4$ are expressed in the following table, wherein the radii and thicknesses are given in inches:

[E.F.=96MM.; $f/5$; MAGNITUDE=12×]

| Lens: | $n_D$ | $v$ | Radii | Thickness |
|---|---|---|---|---|
| A | 1.620 | 60.3 | $R_1=2.2528$ | $T_A=0.3675$ |
|   |       |      | $R_2=6.2673$ | $S_1=0.1788$ |
| B | 1.620 | 60.3 | $R_3=1.2069$ | $T_B=0.5305$ |
|   |       |      | $R_4=16.6854$ | |
| C | 1.617 | 36.6 | $R_5=0.7912$ | $T_C=0.1264$ |
|   |       |      |              | $S_2=0.4312$ |
|   |       |      |              | $S_3=0.6251$ |
| D | 1.575 | 41.3 | $R_6=-0.6654$ | $T_D=0.0859$ |
|   |       |      | $R_7=-5.1639$ | |
| E | 1.620 | 60.3 | $R_8=-0.8881$ | $T_E=0.2249$ |
|   |       |      |              | $S_4=0.1207$ |
|   |       |      | $R_9=92.7218$ | |
| F | 1.617 | 54.0 | $R_{10}=-1.9668$ | $T_F=0.2109$ |

References Cited

UNITED STATES PATENTS 3,043,193   7/1962   Lange et al. _____ 350—221 X

DAVID SCHONBERG, Primary Examiner

A. M. OSTRAGER, Assistant Examiner

U.S. Cl. X.R.

350—209